(12) United States Patent
Albert

(10) Patent No.: US 8,069,662 B1
(45) Date of Patent: Dec. 6, 2011

(54) ECCENTRIC CAM BRAKE BOOSTER

(75) Inventor: Timothy J. Albert, Niles, MI (US)

(73) Assignee: Robert Bosch GmbH, Stuttgart (DE)

( * ) Notice: Subject to any disclaimer, the term of this patent is extended or adjusted under 35 U.S.C. 154(b) by 610 days.

(21) Appl. No.: 12/261,073

(22) Filed: Oct. 30, 2008

(51) Int. Cl.
*F15B 7/08* (2006.01)
*B60T 7/04* (2006.01)

(52) U.S. Cl. .......................... 60/545; 60/594

(58) Field of Classification Search ............ 60/545, 60/594
See application file for complete search history.

(56) References Cited

U.S. PATENT DOCUMENTS

| | | | |
|---|---|---|---|
| 4,395,883 A | 8/1983 | Meliant | |
| 4,852,419 A * | 8/1989 | Kittel et al. | 60/545 |
| 5,667,283 A * | 9/1997 | Drennen et al. | 60/545 |
| 5,943,863 A | 8/1999 | Jordan | |
| 6,574,959 B2 | 6/2003 | Fulks et al. | |
| 6,758,041 B2 | 7/2004 | Bishop et al. | |
| 7,178,654 B2 * | 2/2007 | Ronk et al. | 60/545 |

* cited by examiner

*Primary Examiner* — Michael Leslie
(74) *Attorney, Agent, or Firm* — Maginot, Moore & Beck

(57) ABSTRACT

An electric power booster (12) where driver command is monitored by a transducer (38) on an input rod (34). This signal is converted to the appropriate voltage/current and operates an electric motor (42). The motor output shaft (68) is connected to a planetary gear reducer (72) appropriately sized to provide no more than +/−1/4 turn of an eccentric cam (14). Two master cylinders (16, 18) power piston rods (22, 24) ride diametrically opposed on the cam surface (20). As the cam rotates the piston rods are forced out pressurizing the respective hydraulic circuits and thereby providing fluid to each brake circuit (28, 30). In the event of power failure as well as to augment the output of the motor, the input rod is mechanically linked directly to the cam offset from the center allowing the driver to manually rotate the cam thereby pressurizing the brake circuits.

18 Claims, 5 Drawing Sheets

ECCENTRIC CAM BRAKE BOOSTER

BACKGROUND OF THE INVENTION

1. Field of the Invention

The present invention relates to vehicle brake systems and more particularly to an improved electric power booster.

2. Description of the Related Art

Many of today's vehicles are equipped with power-braking systems to reduce a driver's brake pedal effort. Most use a vacuum to increase braking power. An engine's pistons create a vacuum as they draw air into the engine. The engine intake manifold vacuum is connected by a tube to both sides of a special spring-loaded diaphragm located in a housing intermediate an operator brake actuating pedal mechanism and a master cylinder. When the operator actuates the brake pedal, atmospheric pressure is admitted to one side of the diaphragm supplying additional force to the master cylinder piston and enhanced brake line pressure to the individual wheel cylinders. Vehicle braking is still possible in the event of vacuum source failure since brake pedal pressure may still be directly applied to the master cylinder piston. Vacuum boosters of this type are illustrated in numerous patents, for example, U.S. Pat. No. 5,943,863.

Many vehicles, for example, hybrid vehicles or those employing diesel engines, lack a vacuum source and may utilize a power steering pump or a separate dedicated pump as a hydraulic pressure source, or may employ a separate air compressor for air brakes. All of these systems rely on operation of the vehicle engine to augment operator brake pedal input force.

Several systems eliminate the dependence on manifold vacuum or other power source dependent on engine operation by substituting an electromechanical mechanism for above described vacuum booster. Electric brakes employing electromagnets at individual wheel brake locations to force braking surfaces together have been suggested.

In U.S. Pat. No. 4,395,883, brake pedal force is amplified by an electric motor acting through a gear set which converts, by way of a ball screw arrangement, rotary motion and torque from the motor into linear motion and force to energize the master cylinder piston. Operator input push rod forces are sensed, amplified and modulated by electronic means. The electric motor disengages from the gear set at rest or if there is an electrical failure, so that there is a manual mode of operation available when necessary. A solenoid is used to operate a power clutch to separate the power and no-power apply modes. Suitable controls are provided by force sensing means such as a piezoelectric crystal or some other suitable pressure transducer, and suitable circuitry including control logic in the nature of a microprocessor.

U.S. Pat. Nos. 6,574,959 B2 and 6,758,041 B2 disclose similar systems. The U.S. Pat. No. 6,574,959 arrangement employs a transmission system including a belt wrapped around pulleys to transfer power from a motor to a ball screw, and suggests belts, toothed belts, chain belts or gears and that the pulleys can be sprockets or the like. In the U.S. Pat. No. 6,758,041, a ball screw assembly is operatively connected by pinion and a ball screw drive gears between the output shaft of the electric motor and the booster shaft for converting torque from the motor into axial force applied to the booster shaft. Brake pedal input force is measured by a piezoelectric or magneto-restrictive sensor.

Each of these patented electric booster arrangements is disposed intermediate the brake pedal push rod and the master cylinder input piston rod just as in the case of the traditional vacuum booster. Each employs a rather complex mechanical coupling between the motor and master cylinder piston rod.

It is desirable in an electric booster to simplify the interface between the motor/driveline mechanical components and the hydraulic pistons that transmit fluid to each respective brake circuit.

SUMMARY OF THE INVENTION

The present invention provides an electric booster of very short package length with push through capability on both hydraulic circuits by employing a planetary reduction gear along with an eccentric cam to transmit power to opposing master cylinder pistons.

The invention comprises, in one form thereof, an electrically boosted vehicle brake system having a first hydraulic braking circuit for a first set of vehicle wheels including a master cylinder having a cylindrical bore, a piston reciprocably located within the bore, and a piston actuating rod extending from the master cylinder. There is a second hydraulic braking circuit for a second set of vehicle wheels including a second master cylinder having a second cylindrical bore, a second piston reciprocably located within the second bore, and a second piston actuating rod extending from the second master cylinder. The bore and said second bore are generally coaxial with the actuating rods and extend from the respective master cylinders toward one another. An electromechanical brake actuating mechanism includes a variable width member interposed between the piston rods which is movable from a first quiescent position to increase the separation between the actuating rods thereby applying braking fluid pressure to both hydraulic braking circuits.

In another form of the invention, an electrically boosted vehicle brake system has a master cylinder including a piston, a piston return spring and a piston actuating rod extending from the cylinder. The piston actuating rod is movable from a quiescent position against return spring bias to apply braking fluid pressure to individual wheel brake actuators. A cam which is rotatable about an axis has a variable radius cam surface for engaging and moving the actuating rod. An electric motor is coupled to the cam for rotating the cam and moving the actuating rod.

In still another form of the invention, an electrically boosted vehicle brake system has first and second master cylinders, each including a piston, and a piston actuating rod extending from the respective cylinder. The actuating rods extend from the respective master cylinders toward one another and are movable from quiescent positions to apply braking fluid pressure to respective first and second sets of wheel brake actuators. There is a cam rotatable about an axis having a variable radius cam surface for engaging and moving the actuating rods away from one another and an operator brake pedal and linkage coupled to the cam remote from the axis which is operable in response to operator applied brake pedal pressure to rotate the cam thereby applying braking fluid pressure to both sets of wheel brake actuators.

An advantage of the present invention is that the cam profile is adjustable for different applications.

Another advantage is a very low noise electric booster.

A further advantage an electric booster with potentially high gain capability and good response times.

BRIEF DESCRIPTION OF THE DRAWINGS

Corresponding reference characters indicate corresponding parts throughout the several drawing views.

DETAILED DESCRIPTION OF THE INVENTION

Figure 1:
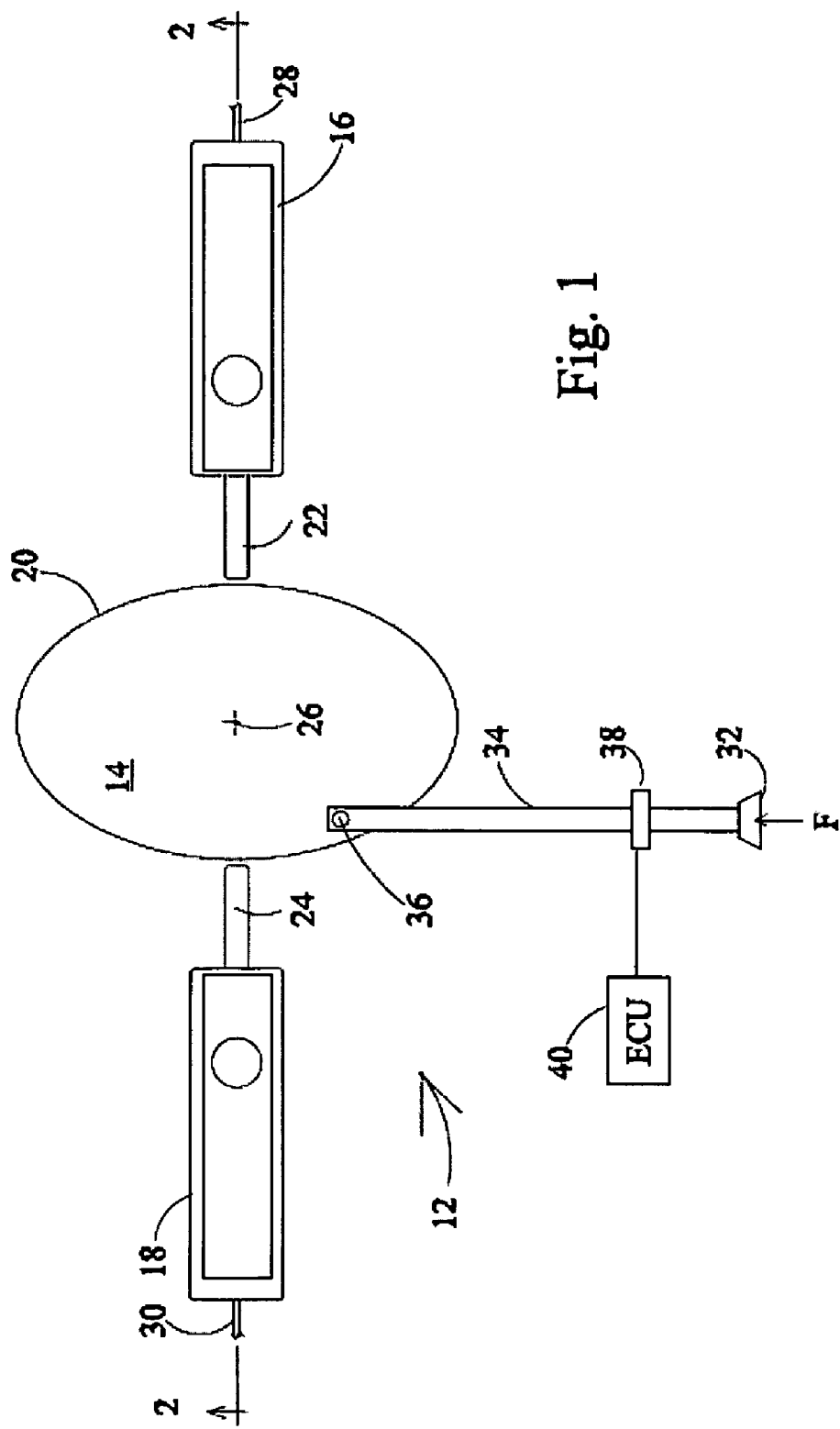
FIG. 1 is a top schematic view of an electric brake booster in a quiescent state.

Referring now to the drawings and particularly to FIG. 1, there is shown an electric booster 12 with cam 14 for actuating opposing master cylinders 16 and 18. The cam has a variable radius surface 20 which engages respective piston actuating rods 22 and 24. The portion of cam surface 20 between 0 and 90 degrees and that between 270 and 360 degrees as viewed in FIG. 1 are opposed symmetric surfaces and the only portions of surface 20 utilized in actuating the piston rods. Cam axis 26 is a two-fold axis of symmetry, that is, rotation of the cam about the axis by 180 degrees results in a cam surface 20 configuration which is indistinguishable from the original. The cam is illustrated a being generally elliptical, but numerous other cam surface configurations are easily envisioned. As the cam 14 rotates about axis 26, the effective cam radius (distance from the center to the end of a piston actuating rod) continuously increases depressing the actuating rod and pressurizing respective brake lines 28 and 30. A vehicle operator actuable brake pedal 32 is connected by a mechanical linkage 34 to a pivot point 36 on the cam for rotating the cam in response to operator applied pedal force to apply the brakes. An elongated slot or other suitable adaptation may be employed to compensate for the fact that the motion of pivot point 36 is along a portion of a circle. No boost is required to apply braking force. There is also a transducer 38 responsive to operator applied pedal force for providing an electrical signal proportional thereto. An electronic control unit 40 responds to transducer signals to enabling a reversible motor (42 in FIG. 2) to supplement operator applied pedal force.

Figure 2:
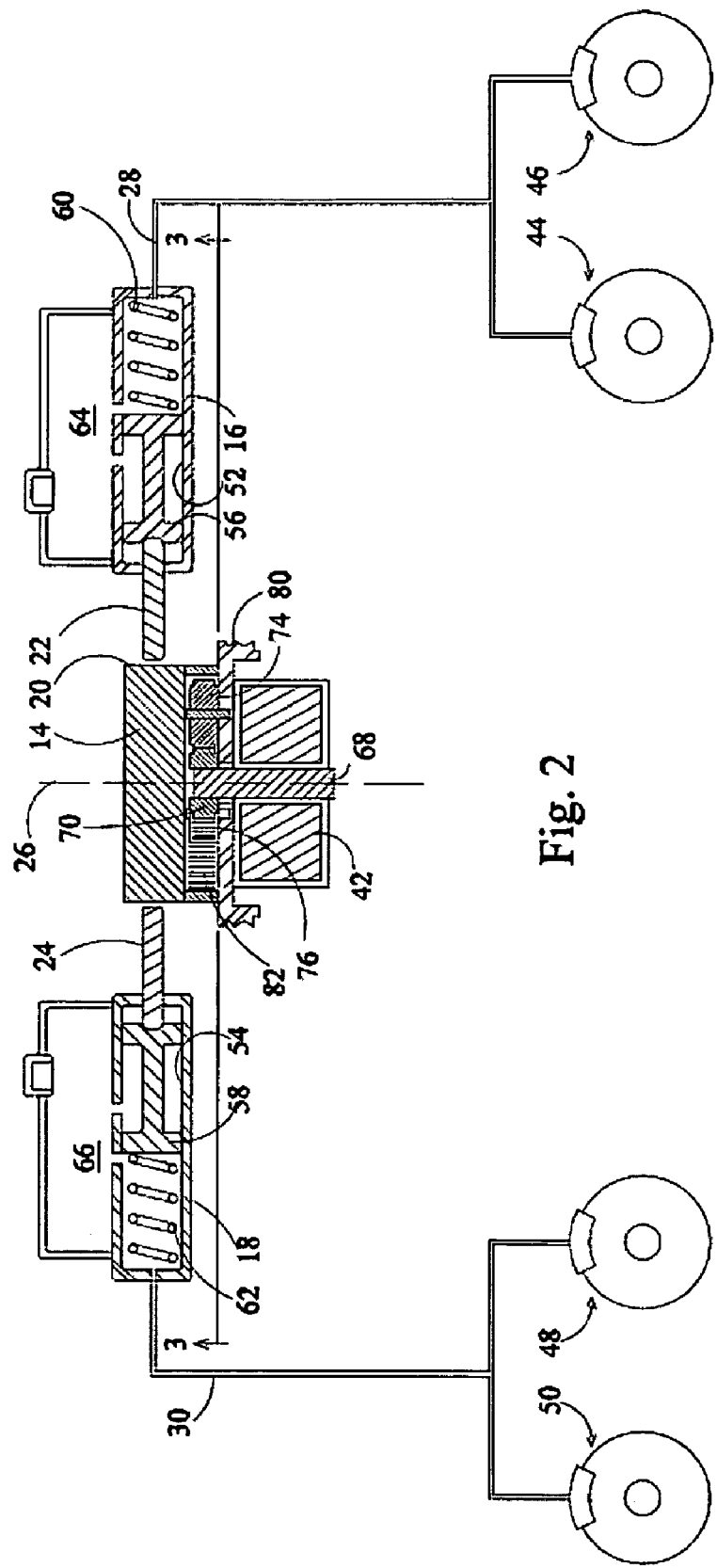
FIG. 2 is a cross-sectional view along lines 2-2 of FIG. 1.

In FIG. 2, a more complete electrically boosted vehicle braking system is shown including a pair of front rotor caliper assemblies 44 and 46, and a pair of rear rotor caliper assemblies 48 and 50. Of course, other types of individual wheel brake actuators, e.g., wheel cylinders actuating brake shoes in conventional drum brakes, may be substituted for either front, rear or both sets of braking arrangements. There is one hydraulic braking circuit for one set of vehicle wheels and a second for the other set. Each circuit includes a master cylinder 16 or 18 having a cylindrical bore 52 or 54 with a piston 56 or 58 reciprocably located within the bore. There is a return spring 60 or 62 for returning the piston to its quiescent position in each bore. Each master cylinder has a reservoir 64 or 66 for replenishing fluid in the bore as needed. Many other master cylinder configurations may be employed. A piston actuating rod 22 or 24 extends from the master cylinders and rides on the variable radius surface 20. The cylindrical bores, pistons and piston rods are all generally coaxial sharing a common axis along the section defining line 2-2 of FIG. 1.

Electric motor 42 has a shaft 68 with a drive or sun gear 70 fixed thereto. Comparing FIGS. 2 and 3, a planetary gear train 72 couples the motor's shaft 68 to the cam 14 and includes three planet gears 74, 76 and 78 rotatable about respective shafts extending from a relatively fixed planet carrier 80. The planet gears engage internal gear teeth 82 of a rotatable annulus or ring gear 84 fixed to the cam 14. The roles of the planet and ring gears may be reversed with the annulus 84 fixed and the planet carrier attached to the cam. An off-axis motor shaft and drive gear directly engaging internal or external teeth on the annulus 84 is also possible.

Figure 3:
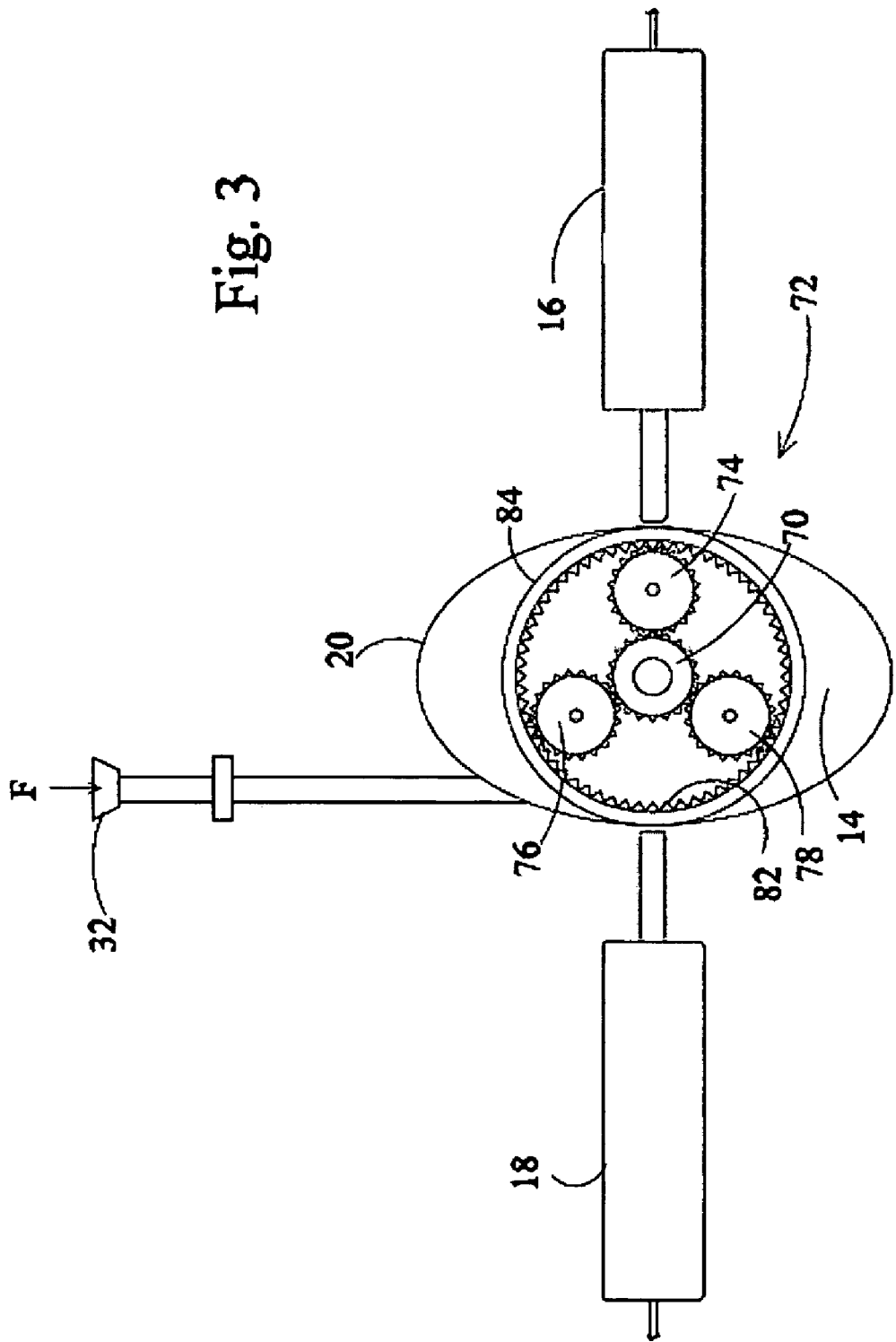
FIG. 3 is a bottom view along lines 3-3 of FIG. 2.
Figure 4:
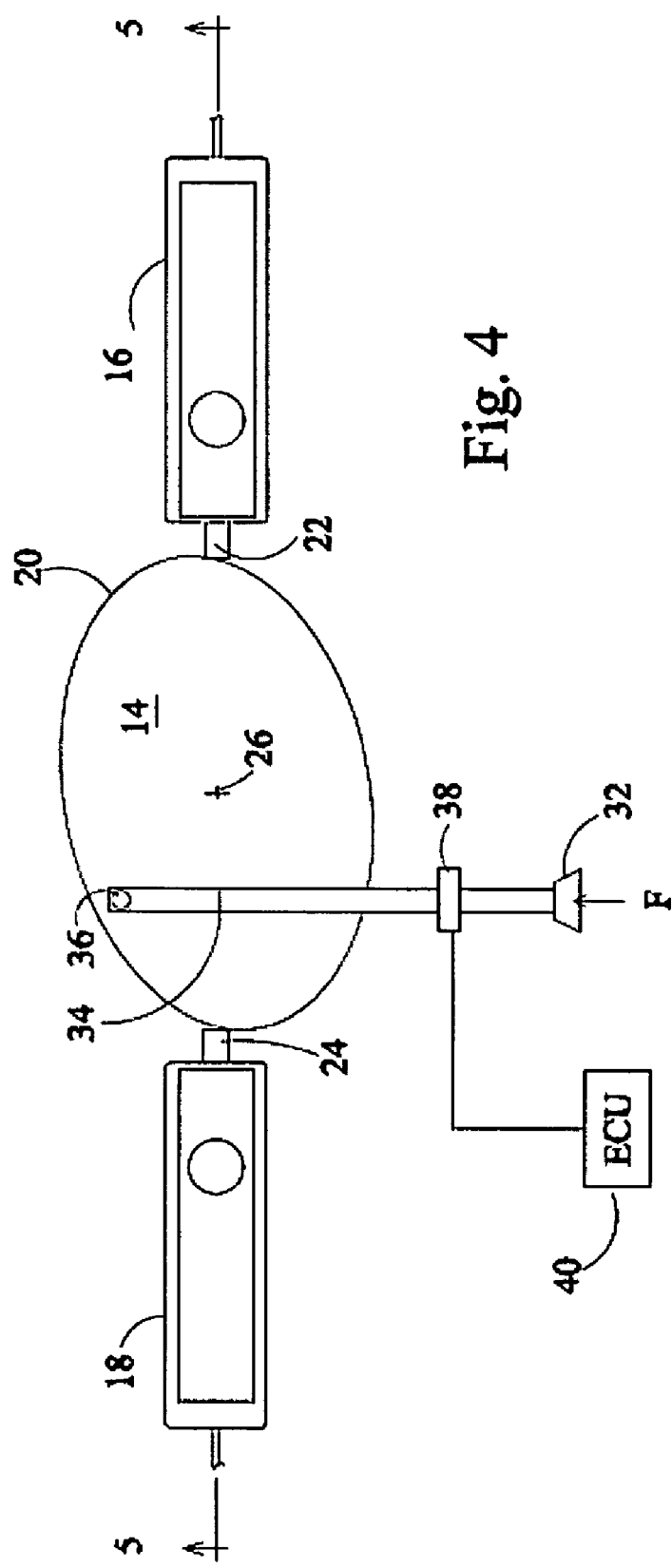
FIG. 4 is a top schematic view of an electric brake booster with the brakes applied.
Figure 5:
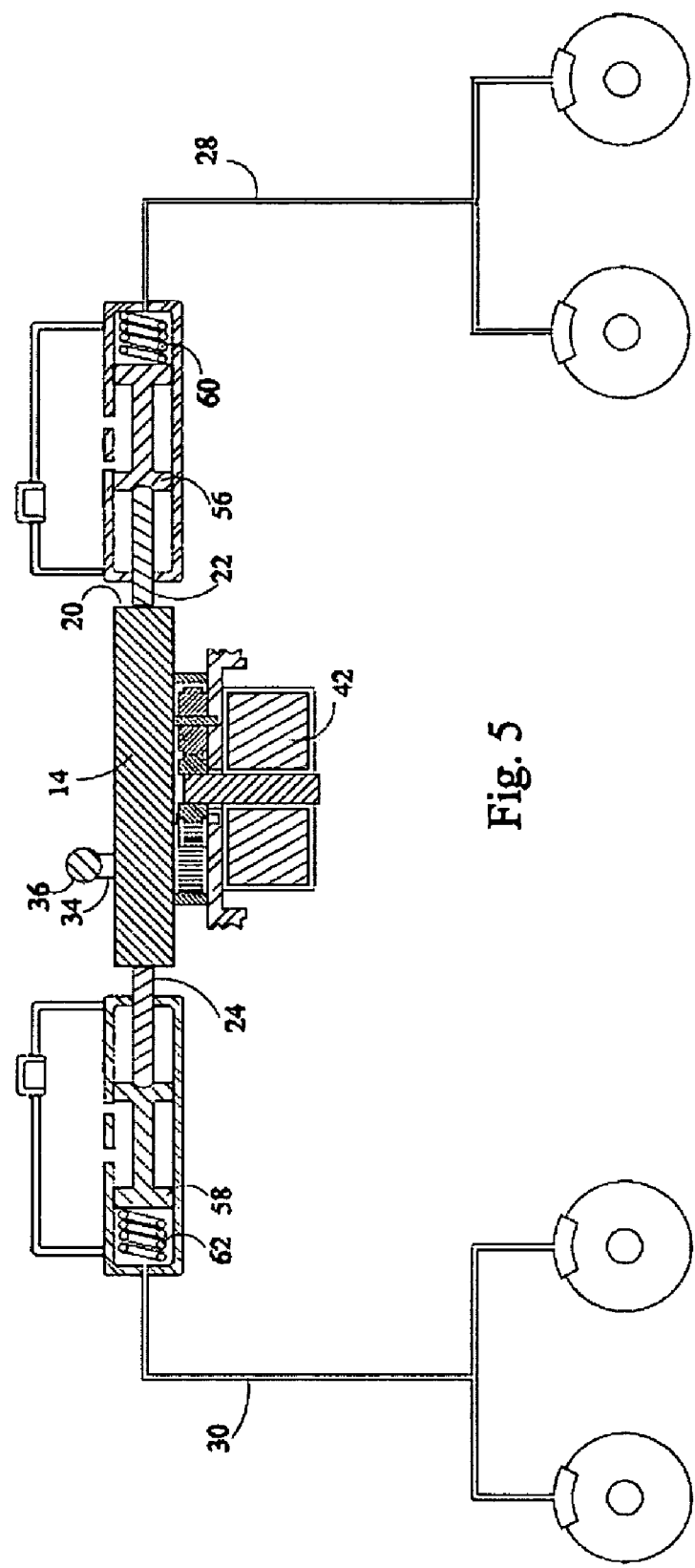
FIG. 5 is a cross-sectional view along lines 5-5 of FIG. 4.

In FIGS. 1, 2 and 3, the braking system is illustrated in the quiescent (brakes unapplied) condition. When the vehicle operator depresses foot pedal 32, cam 14 rotates about axis 26 in a clockwise direction as viewed in FIGS. 2 and 4. The cam rotates through only a fractional part of a complete revolution. Transducer 38 provides a measure of applied pedal pressure to the electronic control unit (ECU) 40 which in turn enables the motor 42 to rotate in a direction to also cause clockwise cam rotation supplementing the driver applied force. Cam rotation depresses the piston rods 22 and 24 causing the master cylinder pistons 56 and 58 to move from the positions shown in FIG. 2 to that shown in FIG. 5 pressurizing the brake lines 28 and 30, and slowing the vehicle. When pedal pressure is reduced, transducer 38 senses this and ECU 40 induces motor rotation in a direction to rotate the cam counter-clockwise somewhat. The return springs 60 and 62 urge the pistons in a direction to maintain piston rod contact with the cam surface reducing the boost.

Now that the present inventive technique is fully understood, variations will readily occur. The cam has been disclosed as being generally elliptical, however other cam shapes are possible. A monotone or continuously increasing radius cam surface over nearly 180 degrees with an abrupt decrease to begin another 180 degrees of increasing radius is possible. This would allow the effective range of cam rotation to be doubled from the 90 degree range of the elliptical cam. Separate individual cams on a common shaft for the individual braking circuits could be used. While a variable radius cam surface is disclosed for actuating the individual piston rods, other variable width members, e.g., a rack and pinion powered wedge, may be interposed between the pistons to increase the separation between the actuating rods thereby applying braking fluid pressure to both hydraulic braking circuits. Numerous other gear trains for coupling the motor and cam can be envisioned.

Thus, while a preferred embodiment has been disclosed, numerous modifications will occur to those of ordinary skill in this art. Accordingly, the scope of the present invention is to be measured by the scope of the claims which follow.

What is claimed is:

1. An electrically boosted vehicle brake system, comprising:
    a master cylinder including a piston, a piston return spring and a piston actuating rod extending from the cylinder, the piston actuating rod being movable from a quiescent position against return spring bias to apply braking fluid pressure to individual wheel brake actuators;
    a cam rotatable about an axis and having a variable radius cam surface for engaging and moving the actuating rod; and
    an electric motor coupled to the cam and operable to rotate the cam and move the actuating rod.

2. The electrically boosted vehicle brake system of claim 1, further comprising a vehicle operator actuable brake pedal, a mechanical linkage coupling the brake pedal to the cam for rotating the cam, and a transducer responsive to operator applied pedal force for providing an electrical signal proportional thereto.

3. The electrically boosted vehicle brake system of claim 2, further comprising an electronic control responsive to transducer signals for enabling the motor to supplement operator applied pedal force.

4. The electrically boosted vehicle brake system of claim 1, further comprising at least two interengaged gears coupling the motor and cam for rotating the cam a fractional part of a complete revolution.

5. The electrically boosted vehicle brake system of claim 4, wherein said at least two gears comprise part of a planetary gear train.

6. The electrically boosted vehicle brake system of claim 1, further comprising a second master cylinder including a second piston, a second piston return spring and a second piston actuating rod extending from the second cylinder, the second piston actuating rod being movable from a quiescent position against return spring bias to apply braking fluid pressure to other individual wheel brake actuators different from said individual wheel brake actuators, said master cylinder and said second master cylinder positioned on opposite sides of the cam with their respective piston actuating rods engaging opposed symmetric cam surfaces.

7. An electrically boosted vehicle brake system, comprising:
   a first hydraulic braking circuit for a first set of vehicle wheels including a master cylinder having a cylindrical bore, a piston reciprocably located within the bore, and a piston actuating rod extending from the master cylinder;
   a second hydraulic braking circuit for a second set of vehicle wheels including a second master cylinder having a second cylindrical bore, a second piston reciprocably located within the second bore, and a second piston actuating rod extending from the second master cylinder;
   said bore and said second bore being generally coaxial with said actuating rod and said second actuating rods extending from the respective master cylinders toward one another; and
   an electromechanical brake actuating mechanism including a variable width member interposed between the piston rods and movable from a first quiescent position to increase the separation between the actuating rods thereby applying braking fluid pressure to both hydraulic braking circuits.

8. The electrically boosted vehicle brake system of claim 7, wherein the electromechanical brake actuating mechanism further includes a reversible electric motor coupled to the variable width member for selectively moving the member toward and away from the first quiescent position.

9. The electrically boosted vehicle brake system of claim 8, wherein the variable width member comprises a cam rotatable about a two-fold cam axis of symmetry.

10. The electrically boosted vehicle brake system of claim 8, further comprising a vehicle operator actuable brake pedal, a mechanical linkage coupling the brake pedal to the member for moving the member, and a transducer responsive to operator applied pedal force for providing an electrical signal proportional thereto.

11. The electrically boosted vehicle brake system of claim 10, further comprising an electronic control responsive to transducer signals for enabling the motor to supplement operator applied pedal force.

12. The electrically boosted vehicle brake system of claim 8, further comprising at least two interengaged gears coupling the motor and member for moving the member.

13. An electrically boosted vehicle brake system, comprising:
   a first master cylinder including a first piston, and a first piston actuating rod extending from the first cylinder, the first piston actuating rod being movable from a quiescent position to apply braking fluid pressure to a first set of wheel brake actuators;
   a second master cylinder including a second piston, and a second piston actuating rod extending from the second cylinder, the second piston actuating rod being movable from a quiescent position to apply braking fluid pressure to a second set of wheel brake actuators;
   said actuating rod and said second actuating rods extending from the respective master cylinders toward one another;
   a cam rotatable about an axis and having a variable radius cam surface for engaging and moving the actuating rods away from one another; and
   an operator brake pedal and linkage coupled to the cam remote from the axis and operable in response to operator applied brake pedal pressure to rotate the cam thereby applying braking fluid pressure to both sets of wheel brake actuators.

14. The electrically boosted vehicle brake system of claim 13, further comprising an electric motor coupled to the cam and operable to rotate the cam and move both actuating rods.

15. The electrically boosted vehicle brake system of claim 14, further comprising a transducer responsive to operator applied pedal force for providing an electrical signal proportional thereto.

16. The electrically boosted vehicle brake system of claim 15, further comprising an electronic control responsive to transducer signals for enabling the motor to supplement operator applied pedal force.

17. The electrically boosted vehicle brake system of claim 14, further comprising at least two interengaged gears coupling the motor and cam for rotating the cam a fractional part of a complete revolution.

18. The electrically boosted vehicle brake system of claim 17, wherein said at least two gears comprise part of a planetary gear train.

* * * * *